United States Patent
Takahashi et al.

(10) Patent No.: US 10,324,391 B2
(45) Date of Patent: Jun. 18, 2019

(54) TONER AND IMAGE FORMATION METHOD

(71) Applicant: KONICA MINOLTA, INC., Tokyo (JP)

(72) Inventors: Seijiro Takahashi, Kokubunji (JP); Hidekazu Kawasaki, Hino (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 15/865,694

(22) Filed: Jan. 9, 2018

(65) Prior Publication Data

US 2018/0217518 A1 Aug. 2, 2018

(30) Foreign Application Priority Data

Jan. 31, 2017 (JP) .................. 2017-015618

(51) Int. Cl.
- G03G 9/09 (2006.01)
- C09B 29/34 (2006.01)
- G03G 9/08 (2006.01)
- G03G 9/087 (2006.01)
- G03G 15/20 (2006.01)

(52) U.S. Cl.
CPC ............ G03G 9/091 (2013.01); C09B 29/34 (2013.01); G03G 9/0819 (2013.01); G03G 9/0821 (2013.01); G03G 9/08711 (2013.01); G03G 9/08755 (2013.01); G03G 9/0926 (2013.01); G03G 15/2007 (2013.01); G03G 15/2064 (2013.01)

(58) Field of Classification Search
CPC ................. G03G 9/091; G03G 13/20
See application file for complete search history.

(56) References Cited

U.S. PATENT DOCUMENTS

| | | | |
|---|---|---|---|
| 4,767,688 A * | 8/1988 | Hashimoto | G03G 9/0924 430/108.1 |
| 5,759,729 A | 6/1998 | Martin et al. | |
| 9,348,252 B2 | 5/2016 | Higuchi et al. | |
| 2003/0203304 A1* | 10/2003 | Katagiri | G03G 9/0912 430/124.4 |
| 2011/0236821 A1* | 9/2011 | Kageyama | G03G 15/201 430/124.1 |
| 2016/0011537 A1* | 1/2016 | Higuchi | G03G 15/04045 399/177 |

FOREIGN PATENT DOCUMENTS

| | | | |
|---|---|---|---|
| JP | 2003-330228 A | | 11/2003 |
| JP | 2004126248 A | * | 4/2004 |
| JP | 2014191077 A | | 10/2014 |
| JP | 2014191078 A | | 10/2014 |

OTHER PUBLICATIONS

English language machine translation of JP 2004-126248 (Apr. 2004).*
Extended European Search Report dated May 4, 2018 from corresponding European Patent Application No. EP 17210836.7.

* cited by examiner

*Primary Examiner* — Christopher D Rodee
(74) *Attorney, Agent, or Firm* — Lucas & Mercanti, LLP (57) ABSTRACT

The present invention provides means for improving the softening rate in photoirradiation and image fixation property.

The toner according to the present invention includes an azobenzene derivative represented by the following chemical formula (1), and in the chemical formula (1), $R_1$ to $R_{10}$ in the following are groups defined in claim 1.

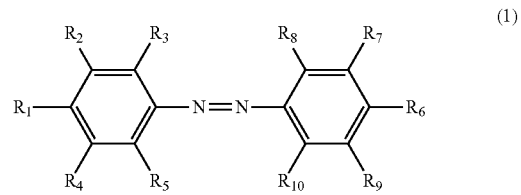

9 Claims, 2 Drawing Sheets

TONER AND IMAGE FORMATION METHOD

CROSS-REFERENCE TO RELATED APPLICATION

The entire disclosure of Japanese Patent Application No. 2017-015618 filed on Jan. 31, 2017, is incorporated herein by reference in its entirety.

BACKGROUND

1. Technological Field

The present invention relates to a toner and an image formation method.

2. Description of Related Arts

An electrophotographic image formation apparatus has been heretofore known in which an electrostatic latent image formed on a photoreceptor is developed with toner to form a toner image, the formed toner image is transferred to a sheet, and the transferred toner image is heated and fixed to form an image on the sheet. In such an image formation apparatus, a toner should be heated at a high temperature to be melted on a temporary basis for fixing a toner image on a sheet. Thus, there is a limit to energy conservation.

In recent years, a system has been proposed in which a toner image is fixed by an external stimulus other than heat for energy conservation in image formation, improvement of operability and expansion of types of media to be covered. In particular, a light-fixation system which is relatively easily compatible with an electrophotographic process has attracted attention, and a developer (light-molten toner) which is softened by light has been reported.

For example, Japanese Patent Application Laid-Open No. 2014-191078 discloses a developer which includes a binding resin, a colorant, and an additive containing a compound which is subjected to phase transition by a cis-trans isomerization reaction by light absorption. As a fixation method using such a developer, Japanese Patent Application Laid-Open No. 2014-191078 discloses a technique in which a toner image transferred to a sheet is irradiated with light to melt a compound which is subjected to phase transition by absorbing light, and the toner image is then irradiated with light again to solidify the compound, whereby the toner image is fixed on the sheet.

Further, Japanese Patent Application Laid-Open No. 2014-191077 (corresponding to U.S. Patent Application Publication No. 2016-011537 and U.S. Pat. No. 9,348,252) discloses an image formation apparatus using a developer containing a compound which is subjected to phase transition by a cis-trans isomerization reaction by light absorption. As one example of such an image formation apparatus, an image formation apparatus has been proposed which includes an exposure apparatus that applies light toward a nip position, a position at which a conveyance belt is sandwiched between a photoreceptor and a transfer roller, during image formation on a recording sheet composed of a transparent resin.

SUMMARY

However, the developers described in Japanese Patent Application Laid-Open No. 2014-191078 and Japanese Patent Application Laid-Open No. 2014-191077 (corresponding to U.S. Patent Application Publication No. 2016-011537 and U.S. Pat. No. 9,348,252) has the problem that productivity is low because a softening rate in photoirradiation is not sufficient, and image fixation property is poor.

Thus, an object of the present invention is to provide means for improving a softening rate in photoirradiation and image fixation property. In addition, an object of the present invention is to provide a means for exhibiting favorable thin line reproducibility.

The present inventors have extensively conducted studies. As a result, the present inventors have found that the above-mentioned objects can be achieved by a toner containing an azobenzene derivative having a specific structure, leading to completion of the present invention.

To achieve at least one of the abovementioned objects, according to an aspect of the present invention, a tonor reflecting one aspect of the present invention comprises an azobenzene derivative represented by the following chemical formula (1).

[Chemical Formula 1]

(1)

In the chemical formula (1), $R_1$ to $R_{10}$ are each independently a group selected from the group consisting of a hydrogen atom, an alkyl group, an alkoxy group, a halogen group, a hydroxy group and a carboxy group, and at least three of $R_1$ to $R_{10}$ are groups selected from the group consisting of an alkyl group, an alkoxy group, a halogen group, a hydroxy group and a carboxy group, where at least one of $R_1$ to $R_5$ is an alkyl group or alkoxy group having 1 to 18 carbon atoms, and at least one of $R_6$ to $R_{10}$ is an alkyl group or alkoxy group having 1 to 18 carbon atoms.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

The present invention provides a toner including an azobenzene derivative represented by the following chemical formula (1).

[Chemical Formula 2]

In the chemical formula (1), $R_1$ to $R_{10}$ are each independently a group selected from the group consisting of a hydrogen atom, an alkyl group, an alkoxy group, a halogen group, a hydroxy group and a carboxy group, and at least three of $R_1$ to $R_{10}$ are groups selected from the group consisting of an alkyl group, an alkoxy group, a halogen group, a hydroxy group and a carboxy group, where at least one of $R_1$ to $R_5$ is an alkyl group or alkoxy group having 1 to 18 carbon atoms, and at least one of $R_6$ to $R_{10}$ is an alkyl group or alkoxy group having 1 to 18 carbon atoms.

The toner of the present invention which includes an azobenzene derivative having the above-mentioned structure has an improved softening rate in photoirradiation and is excellent in image fixation property. In addition, the toner of the present invention can exhibit favorable thin line reproducibility.

While details of the reason why the above-mentioned effect is obtainable by the toner of the present invention are unknown, the following mechanism is conceivable. The following mechanism is based on speculation, and the present invention is in no way limited to the following mechanism. In the following description, the azobenzene derivative represented by the chemical formula (1) is also referred to simply as an "azobenzene derivative of the present invention".

It is known that an azobenzene compound is a material which is softened (subjected to photo-phase transition) from a solid state by absorbing light, and it is considered that photo-phase transition of the azobenzene compound is caused by collapse of a crystal structure due to cis-trans isomerization. An azobenzene compound generally has a strong π-π interaction between molecules, and therefore photo-phase transition occurs only at an extremely outermost surface of a crystal structure.

On the other hand, in the azobenzene derivative in the present invention, two benzene rings are each independently substituted with an alkyl group or alkoxy group. Since an alkyl group or alkoxy group has thermal motility, the azobenzene derivative in the present invention forms a specific crystal structure in which structures isotropically disordered by thermal mobility of the alkyl group or alkoxy group coexist in a periodic structure dominated by the π-π interaction of an azobenzene moiety. Thus, when a cis-trans isomerization reaction locally proceeds, and the π-π interaction of the azobenzene moiety is reduced, isotropic melting serially occurs in the whole structure. In addition, the azobenzene derivative in the present invention has a structure in which at least three hydrogen atoms of azobenzene are each replaced by a group selected from the group consisting of an alkyl group, an alkoxy group, a halogen group, a hydroxy group and a carboxy group. Since the azobenzene derivative has such a structure, lattice defects are generated, a free volume is developed, a π-π interaction is reduced, and so on. These phenomena act in favor of cis-trans isomerization. Accordingly, cis-trans isomerization easily proceeds, leading to an increase in softening rate. Therefore, in the toner of the present invention, the softening rate in photoirradiation is improved, so that the image fixation property can be improved with smaller energy.

Hereinafter, a preferred embodiment of the present invention will be described. In this specification, "X to Y" indicating the range means "X or more and Y or less". In this specification, operations and measurements of physical properties etc. are performed under the condition of room temperature (20 to 25° C.) and a relative humidity of 40 to 50% RH.

[Configuration of Toner]
<Azobenzene Derivative>

The present invention provides a toner including an azobenzene derivative represented by the following chemical formula (1).

[Chemical Formula 3]

In the chemical formula (1), $R_1$ to $R_{10}$ are each independently a group selected from the group consisting of a hydrogen atom, an alkyl group, an alkoxy group, a halogen group, a hydroxy group and a carboxy group, and at least three of $R_1$ to $R_{10}$ are groups selected from the group consisting of an alkyl group, an alkoxy group, a halogen group, a hydroxy group and a carboxy group, where at least one of $R_1$ to $R_5$ is an alkyl group or alkoxy group having 1 to 18 carbon atoms, and at least one of $R_6$ to $R_{10}$ is an alkyl group or alkoxy group having 1 to 18 carbon atoms.

Examples of the alkyl group include linear alkyl groups such as a methyl group, an ethyl group, a n-propyl group, a n-butyl group, a n-pentyl group, a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group and a n-hexadecyl group; and branched alkyl groups such as an isopropyl group, an isobutyl group, a sec-butyl group, a tert-butyl group, an isoamyl group, a tert-pentyl group, a neopentyl group, a 1-methylpentyl group, a 4-methyl-2-pentyl group, a 3,3-dimethylbutyl group, a 2-ethylbutyl group, a 1-methylhexyl group, a tert-octyl group, a 1-methylheptyl group, a 2-ethylhexyl group, a 2-propylpentyl group, a 2,2-dimethylheptyl group, a 2,6-dimethyl-4-heptyl group, a 3,5,5-hexyl group, a 1-methyldecyl group and a 1-hexylheptyl group.

Examples of the alkoxy group include linear alkoxy groups such as a methoxy group, an ethoxy group, a n-propoxy group, a n-butoxy group, a n-pentyloxy group, a n-hexyloxy group, a n-heptyloxy group, a n-octyloxy group, a n-nonyloxy group, a n-decyloxy group, a n-undecyloxy group, a n-dodecyloxy group, a n-tridecyloxy group, a n-tetradecyloxy group, a n-pentadecyloxy group and a n-hexadecyloxy group; and branched alkoxy groups such as an isopropoxy group, a tert-butoxy group, a 1-methylpentyloxy group, a 4-methyl-2-pentyloxy group, a 3,3-dimethylbutyloxy group, a 2-ethylbutyloxy group, a 1-methylheptyloxy group, a tert-octyloxy group, a 1-methylheptyloxy group, a 2-ethylhexyloxy group, a 2-propylpentyloxy group, 2,2-dimethylheptyloxy group, a 2,6-dimethyl-4-heptyloxy group, a 3,5,5-trimethylhexyloxy group, a 1-methyl-decyloxy group and a 1-hexylheptyloxy group.

The halogen group refers to a fluoro group (—F), a chloro group (—Cl), a bromo group (—Br) or an iodo group (—I).

In the chemical formula (1), $R_1$ and $R_6$ are preferably each independently an alkyl group or alkoxy group having 1 to 18 carbon atoms. In particular, $R_1$ and $R_6$ are preferably each independently an alkoxy group having 1 to 18 carbon atoms for further improving of image fixation property. When an alkyl group or alkoxy group having 1 to 18 carbon atoms is present at the para position in two benzene rings as described above, thermal mobility of the molecule is increased, so that isotropic melting easily occurs serially in the whole system as described above. Here, the alkyl group or alkoxy group having 1 to 18 carbon atoms, which is disposed in $R_1$ and $R_6$, may be linear or branched, but the alkyl group or alkoxy group is preferably linear for forming a structure of rod-like molecules that are easily subjected to photo-phase transition.

In particular, $R_1$ and $R_6$ are preferably each independently an alkyl group or alkoxy group having 6 to 12 carbon atoms. When each of $R_1$ and $R_6$ is an alkyl group or alkoxy group with a carbon number within the above-mentioned range, an alkyl-alkyl interaction acting between molecules is relatively weak while high thermal mobility is exhibited. Accordingly, cis-trans isomerization more easily proceeds, leading to further improvement of the softening rate in photoirradiation and image fixation property.

$R_1$ and $R_6$ may be the same or different, but they are preferably the same from the viewpoint of ease of synthesis.

In the chemical formula (1), at least one of $R_2$ to $R_5$ and $R_7$ to $R_{10}$ is a group selected from the group consisting of an alkyl group, an alkoxy group, a halogen group, a hydroxy group and a carboxy group (hereinafter, referred to simply as a substituent). Since the azobenzene derivative has such a structure, lattice defects are generated, a free volume is developed, and a π-π interaction is reduced. These phenomena act in favor of cis-trans isomerization. Accordingly, cis-trans isomerization more easily proceeds, leading to further improvement of the softening rate in photoirradiation and image fixation property. In particular, at least one of $R_2$ to $R_5$ and $R_7$ to $R_{10}$ is preferably an alkyl group or alkoxy group having 1 to 4 carbon atoms and optionally having a branch, or a halogen group for securing a free volume required for cis-trans isomerization, more preferably an alkyl group having 1 to 4 carbon atoms, still more preferably a methyl group for further improving image fixation property.

In the chemical formula (1), the number of substituents in $R_2$ to $R_5$ and $R_7$ to $R_{10}$ is preferably 1 to 8, more preferably 1 to 6. In particular, the number of substituents is still more preferably 1 to 4, especially preferably 1 to 3 for further improving the heat-resistance storage property of a toner without excessively reducing the melting point of the azobenzene derivative.

The position at which a substituent is present in each of $R_2$ to $R_5$ and $R_7$ to $R_{10}$ is not particularly limited, but it is preferable that at least one of $R_2$, $R_4$, $R_7$ and $R_9$ in the chemical formula (1) (in other words, the ortho position in $R_1$ and the ortho position in $R_6$) has a substituent, and it is more preferable that at least one of $R_2$, $R_4$, $R_7$ and $R_9$ in the chemical formula (1) has a methyl group. With an azobenzene derivative having such a structure, image fixation property is improved because the softening rate in photoirradiation is further improved, and heat-resistance storage property of the toner is improved because the melting point is moderately increased.

The azobenzene derivative in the present invention is preferably a compound in which hydrogen atoms added to a benzene ring are monosubstituted, disubstituted or trisubstituted with a group selected from the group consisting of an alkyl group, an alkoxy group, a halogen group, a hydroxy group and a carboxy group in a 4,4'-dialkylazobenzene of chemical formula (1) with $R_1$ and $R_6$ being the same alkyl group having 1 to 18 carbon atoms (such as 4,4'-dihexylazobenzene, 4,4'-dioctylazobenzene, 4,4'-didecylazobenzene, 4,4'-didodecylazobenzene or 4,4'-dihexadecylazobenzene) or a 4,4'-bis(alkoxy)azobenzene of chemical formula (1) with $R_1$ and $R_6$ being the same alkoxy group having 1 to 18 carbon atoms (such as 4,4'-bis(hexyloxy)azobenzene, 4,4'-bis(octyloxy)azobenzene, 4,4'-bis(dodecyloxy)azobenzene or 4,4'-bis(hexadecyloxy)azobenzene). More specific examples of the azobenzene derivative include the following azobenzene derivatives (1) to (12).

[Chemical Formula 4-1]
Azobenzene derivative

(1)

(2)

(3)

(4)

(5)

(6)

(7)

[Chemical Formula 4-2]

The method for synthesizing the azobenzene derivative is not particularly limited, and a previously known synthesis method can be applied.

For example, as in the following reaction scheme A, 4-aminophenol is reacted with sodium nitrite under cooling to produce a diazonium salt, the diazonium salt is reacted with o-cresol to synthesize an intermediate A (first stage), and n-bromohexane is then caused to act on the intermediate A, whereby the azobenzene derivative (1) can be obtained (second stage).

(Reaction Scheme A)

[Chemical Formula 5]
First stage

In the reaction scheme A, raw materials (4-aminophenol, o-cresol and/or n-bromohexane) to be used are changed to other compounds, whereby an azobenzene derivative of chemical formula (1) with $R_1$ and $R_6$ being alkoxy groups can be obtained. A person skilled in the art can appropriately make the above-mentioned change to synthesize a desired azobenzene derivative. In addition, according to the above-mentioned production method, an azobenzene derivative having an asymmetric structure can be easily obtained.

For example, as in the following reaction scheme B, o-cresol and n-bromohexane are changed to 2-bromophenol and n-bromododecane, respectively, whereby an azobenzene derivative (4) can be obtained.

[Chemical Formula 6]

(Reaction Scheme B)

-continued

In addition, as in the following reaction scheme C, an azobenzene derivative (4) is reacted with methanol in the presence of a Pd catalyst and a base, whereby an azobenzene derivative (5) can be obtained.

[Chemical Formula 7]

(Reaction Scheme C)

Alternatively, for example, as in the following reaction scheme D, manganese dioxide as an oxidizing agent is reacted with p-hexylaniline to synthesize 4,4'-dihexylazobenzene, N-bromosuccinimide is then reacted, and methylboronic acid is reacted in the presence of a Pd catalyst and a base, whereby an azobenzene derivative (6) can be obtained.

(Reacton Scheme D)

[Chemical Formula 8]

In the reaction scheme D, raw materials (p-hexylaniline and/or methylboronic acid) to be used are changed to other compounds, whereby an azobenzene derivative of chemical formula (1) with $R_1$ and $R_6$ being alkyl groups can be obtained. A person skilled in the art can appropriately make the above-mentioned change to synthesize a desired azobenzene derivative.

The azobenzene derivatives in the present invention may be used alone, or in combination of two or more thereof.

<Binding Resin>

Preferably, the toner of the present invention contains a binding resin. When the toner contains a binding resin, the toner has an appropriate viscosity, so that bleeding in application of the toner to a sheet is suppressed, resulting in improvement of thin line reproducibility and dot reproducibility. It is generally known that as a method for producing a toner, toner particles having a substantially uniform particle diameter and shape can be prepared by using an emulsion aggregation method as described later. When the azobenzene derivative shown in the chemical formula (1) is used alone, toner particles cannot be prepared by means of salting-out in the emulsion aggregation method in view of the molecular structure of the azobenzene derivative, but when the azobenzene derivative and a binding resin are used in combination, toner particles having a substantially uniform particle diameter and shape can be prepared by means of salting-out in the emulsion aggregation method. Accordingly, a toner containing an azobenzene derivative and a binding resin can be easily applied as an electrophotographic toner.

The binding resin is not particularly limited, and a resin that is commonly used as a binding resin for forming a toner can be used. Specific examples thereof include styrene resins, acrylic resins, styrene-acrylic resins, polyester resins, silicone resins, olefin resins, amide resins and epoxy resins. These binding resins can be used alone or in combination of two or more thereof.

Among the resins described above, for ensuring that the binding resin has a low viscosity when melted, and has high sharp melt property, it is preferable that the binding resin includes at least one selected from the group consisting of a styrene resin, an acrylic resin, a styrene-acrylic resin and a polyester resin, and it is more preferable that the binding resin includes at least one selected from the group consisting of a styrene-acrylic resin and a polyester resin.

Hereinafter, styrene-acrylic resins and polyester resins as preferred binding resins will be described.

(Styrene-Acrylic Resin)

The styrene-acrylic resin mentioned in the present invention is a compound formed by performing polymerization using at least a styrene monomer and a (meth)acrylic acid ester monomer. Here, examples of the styrene monomers include styrene represented by the structural formula of $CH_2=CH-C_6H_5$, and a compound having a structure in which a known side chain and functional group are present in a styrene structure.

In addition, the (meth)acrylic acid ester monomer is a compound having on a side chain a functional group having an ester bond. Specific examples thereof include acrylic acid ester monomers represented by $CH_2=CHCOOR$ (R is an alkyl group), and vinyl-based ester compounds such as methacrylic acid ester monomers represented by $CH_2=C(CH_3)COOR$ (R is an alkyl group).

Specific examples of the styrene monomer and (meth) acrylic acid ester monomer capable of forming a styrene-acrylic resin include, but are not limited to, those shown below.

Examples of the styrene monomer include styrene, o-methylstyrene, m-methylstyrene, p-methylstyrene, α-methylstyrene, p-phenylstyrene, p-ethylstyrene, 2,4-dimethylstyrene, p-tert-butylstyrene, p-n-hexylstyrene, p-n-octylstyrene, p-n-nonylstyrene, p-n-decylstyrene and p-n-dodecylstyrene.

Typical examples of the (meth) acrylic acid ester monomer include the acrylic acid ester monomers and methacrylic acid ester monomers shown below, and examples of the acrylic acid ester monomer include methyl acrylate, ethyl acrylate, n-propyl acrylate, isopropyl acrylate, n-butyl acrylate, isobutyl acrylate, tert-butyl acrylate, n-octyl acrylate, 2-ethylhexyl acrylate, stearyl acrylate, lauryl acrylate and phenyl acrylate. Examples of the methacrylic acid ester monomer include methyl methacrylate, ethyl methacrylate, n-propyl methacrylate, isopropyl methacrylate, n-butyl methacrylate, isobutyl methacrylate, tert-butyl methacrylate, n-octyl methacrylate, 2-ethylhexyl methacrylate, stearyl methacrylate, lauryl methacrylate, phenyl methacrylate, diethylaminoethyl methacrylate and dimethylaminoethyl methacrylate.

These styrene monomers, acrylic acid ester monomers and methacrylic acid ester monomers can be used alone or in combination of two or more thereof.

In addition, examples of the styrene-acryl copolymer include copolymers formed from only the styrene monomer and (meth)acrylic acid ester monomer, and copolymers formed using a general vinyl monomer in combination with the styrene monomer and (meth)acrylic acid ester monomer. Examples of the vinyl monomer that can be used in combination in formation of the styrene-acryl copolymer mentioned in the present invention are shown below, but the vinyl monomer that can be used in combination is not limited to those shown below.

(1) Olefins
Ethylene, propylene, isobutylene, etc.
(2) Vinyl Esters
Vinyl propionate, vinyl acetate, vinyl benzoate, etc.
(3) Vinyl Ethers
Vinyl methyl ether, vinyl ethyl ether, etc.
(4) Vinyl Ketones
Vinyl methyl ketone, vinyl ethyl ketone, vinyl hexyl ketone, etc.
(5) N-Vinyl Compounds
N-vinylcarbazole, N-vinylindole, N-vinylpyrrolidone, etc.
(6) Others
Vinyl compounds such as vinyl naphthalene and vinyl pyridine, acrylic acid or methacrylic acid derivatives such as acrylonitrile, methacrylonitrile and acrylamide, etc.

It is also possible to prepare a resin with a crosslinked structure using a polyfunctional vinyl monomer. It is also possible to use a vinyl monomer having an ionically dissociative group on a side chain. Specific examples of the ionically dissociative group include a carboxyl group, a sulfonic acid group and a phosphoric acid group. Specific examples of the vinyl monomer having such an ionically dissociative group are shown below.

Specific examples of the vinyl monomer having a carboxyl group include acrylic acid, methacrylic acid, maleic acid, itaconic acid, cinnamic acid, fumaric acid, maleic acid monoalkyl esters and itaconic acid monoalkyl esters.

The method for forming a styrene-acrylic resin is not particularly limited, and examples thereof include a method in which a monomer is polymerized using a known oil-soluble or water-soluble polymerization initiator. A known chain transfer agent such as n-octyl mercaptan or n-octyl-3-mercaptopropionate may be used as necessary.

In formation of a styrene-acrylic resin for use in the present invention, the content of each of the styrene monomer and the acrylic acid ester monomer is not particularly limited, and can be appropriately adjusted for controlling the softening temperature and glass transition temperature of the binding resin. Specifically, the content of the styrene monomer is preferably 40 to 95% by mass, more preferably 50 to 80% by mass based on the total amount of monomers. The content of the acrylic acid ester monomer is preferably from 5 to 60% by mass, more preferably from 10 to 50% by mass based on the total amount of monomers.

The method for forming a styrene-acrylic resin is not particularly limited, and examples thereof include a method in which a monomer is polymerized using a known oil-soluble or water-soluble polymerization initiator. Specific examples of the oil-soluble polymerization initiator include azo-based or diazo-based polymerization initiators and peroxide-based polymerization initiators as shown below.

Examples of the azo-based or diazo-based polymerization initiator include 2,2'-azobis-(2,4-dimethylvaleronitrile), 2,2'-azobisisobutyronitrile, 1,1'-azobis (cyclohexane-1-carbonitrile), 2,2'-azobis-4-methoxy-2,4-dimethylvaleronitrile and azobisisobutyronitrile.

Examples of the peroxide-based polymerization initiator include benzoyl peroxide, methyl ethyl ketone peroxide, diisopropyl peroxycarbonate, cumene hydroperoxide, tert-butyl hydroperoxide, di-tert-butyl peroxide, dicumyl peroxide, 2,4-dichlorobenzoyl peroxide, lauroyl peroxide, 2,2-bis-(4,4-tert-butylperoxycyclohexyl)propane and tris-(tert-butylperoxy)triazine.

In addition, when styrene-acrylic resin particles are formed by an emulsion polymerization method, a water-soluble radical polymerization initiator can be used. Examples of the water-soluble radical polymerization initiator include persulfates such as potassium persulfate and ammonium persulfate, azobis-aminodipropane acetic acid salts, azobiscyanovaleric acid and salts thereof, and hydrogen peroxide.

The polymerization temperature varies depending on the types of a monomer and polymerization initiator to be used, but it is preferably 50 to 100° C., more preferably 55 to 90° C. The polymerization time varies depending on the types of a monomer and polymerization initiator to be used, but for example, it is preferably 2 to 12 hours.

The styrene-acrylic resin particles formed by an emulsion polymerization method may have a structure of two or more layers including resins having different compositions. As a production method here, a multistage polymerization method can be employed in which a polymerization initiator and a polymerizable monomer are added to a resin particle dispersion liquid prepared by an emulsion polymerization treatment (first-stage polymerization) conforming to a usual method, and the system is subjected to a polymerization treatment (second-stage polymerization).

The glass transition temperature (Tg) of the styrene-acrylic resin is preferably in a range of 35 to 70° C., more preferably in a range of 40 to 60° C. from the viewpoint of fixation property and heat-resistance storage property. The glass transition temperature Tg can be measured by differential scanning calorimetry (DSC).

(Polyester Resin)

The polyester resin is a known polyester resin obtained by a polycondensation reaction of a di-or-more-valent carboxylic acid (polyvalent carboxylic acid component) and a di-or-more-hydric alcohol (polyhydric alcohol component). The polyester resin may be amorphous or crystalline.

The valence number of each of the polyvalent carboxylic acid component and the polyhydric alcohol component is preferably 2 to 3, especially preferably 2, and thus as an especially preferred form, polyvalent carboxylic acid components and polyhydric alcohol components each having a valence number of 2 (i.e. dicarboxylic acid components and diol components) will be described.

Examples of the dicarboxylic acid component include saturated aliphatic dicarboxylic acids such as oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid (dodecanedioic acid), 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid and 1,18-octadecanedicarboxylic acid; unsaturated aliphatic dicarboxylic acids such as methylene succinic acid, fumaric acid, maleic acid, 3-hexenedioic acid, 3-octenedioic acid and dodecenylsuccinic acid; and unsaturated aromatic dicarboxylic acids such as phthalic acid, terephthalic acid, isophthalic acid, t-butylisophthalic acid, tetrachlorophthalic acid, chlorophthalic acid, nitrophthalic acid, p-phenylenediacetic acid, 2,6-naphthalenedicarboxylic acid, 4,4'-biphenyldicarboxylic acid and anthracenedicarboxylic acid. In addition, lower alkyl esters and acid anhydrides thereof can be used. The dicarboxylic acid components may be used alone or in combination of two or more thereof.

In addition, polycarboxylic acids having a valence number of 3 or more, such as trimellitic acid and pyromellitic acid, anhydrides of the above-mentioned carboxylic acid compounds, and alkyl esters having 1 to 3 carbon atoms, and the like can be used.

Examples of the diol component include saturated aliphatic diols such as ethylene glycol, 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,20-eicosanediol and neopentyl glycol; unsaturated aliphatic diols such as 2-butene-1,4-diol, 3-butene-1,4-diol, 2-butyne-1,4-diol, 3-butyne-1,4-diol and 9-octadecene-7,12-diol; and aromatic diols such as bisphenols such as bisphenol A and bisphenol F, and alkylene oxide adducts such as ethylene oxide adducts and propylene oxide adducts of the bisphenols. In addition, derivatives thereof can be used. The diol components may be used alone or in combination of two or more thereof.

The method for producing the polyester resin is not particularly limited, and examples thereof include a method in which the polyvalent carboxylic acid component and the polyhydric alcohol component are subjected to polycondensation (esterification) using a known esterification catalyst.

Examples of the catalyst that can be used in production of the polyester resin include compounds containing a alkali metal element such as sodium and lithium; compounds containing a Group 2 element such as magnesium and calcium; compounds containing a metal element such as aluminum, zinc, manganese, antimony, titanium, tin, zirconium and germanium; phosphorous acid compounds; phosphoric acid compounds; and amine compounds. Specific examples of the tin compound may include dibutyltin oxide, tin octylate, tin dioctylate and salts thereof. Examples of the titanium compound may include titanium alkoxides such as tetra-normal-butyl titanate (Ti(O-n-Bu)$_4$), tetraisopropyl titanate, tetramethyl titanate and tetrastearyl titanate; titanium acylates such as polyhydroxytitanium stearate; and titanium chelates such as titanium tetraacetylacetnate, titanium lactate and titanium triethanolaminate. Examples of the germanium compound may include germanium dioxide. Examples of the aluminum compound may include polyaluminum hydroxide, aluminum alkoxide and tributyl aluminate. These compounds may be used alone or in combination of two or more thereof.

The polymerization temperature is not particularly limited, but it is preferably 70 to 250° C. In addition, the polymerization time is not particularly limited, but it is preferably 0.5 to 10 hours. During polymerization, the inside of the reaction system may be decompressed as necessary.

The glass transition temperature (Tg) of the polyester resin is preferably in a range of 35 to 70° C., more preferably in a range of 40 to 60° C. from the viewpoint of fixation property and heat-resistance storage property. The glass transition temperature Tg can be measured by differential scanning calorimetry (DSC).

When the toner of the present invention contains a binding resin, the content ratio of azobenzene derivative and binding resin (azobenzene derivative:binding resin) is preferably in a range of 5:95 to 80:20 (mass ratio), more preferably in a range of 10:90 to 50:50 (mass ratio). When the content ratio is in the above-mentioned range, photophase transition of the azobenzene derivative easily occurs, and the toner has a sufficient softening rate in photoirradiation. In addition, excellent thin line reproducibility and dot reproducibility are obtained.

The toner containing an azobenzene derivative represented by the chemical formula (1), and a binding resin may have a single-layer structure or a core-shell structure. The types of the core particle and the binding resin to be used for the shell part in the core-shell structure are not particularly limited.

<Colorant>

The toner of the present invention may contain a colorant. As the colorant, commonly known dyes and pigments can be used.

Examples of the colorant for obtaining a black toner include carbon black, magnetic materials and iron-titanium composite oxide black, and examples of the carbon black include channel black, furnace black, acetylene black, thermal black and lamp black. Examples of the magnetic material include ferrite and magnetite.

Examples of the colorant for obtaining a yellow toner include dyes such as C.I. Solvent Yellows 19, 44, 77, 79, 81, 82, 93, 98, 103, 104, 112 and 162; and pigments such as C.I. Pigment Yellows 14, 17, 74, 93, 94, 138, 155, 180 and 185.

Examples of the colorant for obtaining a magenta toner include dyes such as C.I. Solvent Reds 1, 49, 52, 58, 63, 111 and 122; and pigments such as C.I. Pigment Reds 5, 48:1, 53:1, 57:1, 122, 139, 144, 149, 166, 177, 178 and 222.

Examples of the colorant for obtaining a cyan toner include dyes such as C.I. Solvent Blues 25, 36, 60, 70, 93 and 95; and pigments such as C.I. Pigment Blues 1, 7, 15, 60, 62, 66 and 76.

The colorants for obtaining the toners with the colors may be used alone or in combination of two or more thereof for each color.

The content ratio of the colorant in the toner is preferably from 0.5 to 20% by mass, more preferably from 2 to 10% by mass.

<Release Agent>

The toner according to the present invention may contain a release agent. The release agent to be used is not particularly limited, and various known waxes can be used. Examples of the wax include polyolefins such as low-molecular-weight polypropylene and polyethylene, oxidation-type low-molecular-weight polypropylene and polyethylene, paraffins and synthetic ester waxes, and in particular, use of a synthetic ester wax is preferable because it has a low melting point and a low viscosity. Use of behenyl behenate, glycerin tribehenate, pentaerythritol tetrabehenate or the like as the synthetic ester wax is especially preferable.

The content ratio of the release agent in the toner is preferably in a range of 1 to 30% by mass, more preferably in a range of 3 to 15% by mass.

<Charge Control Agent>

The toner according to the present invention may contain a charge control agent. The charge control agent to be used is not particularly limited as long as it is a substance capable of applying a positive or negative charge by frictional charging and having no color, and various known positively chargeable charge control agents and negatively chargeable charge control agents can be used.

The content ratio of the charge control agent in the toner is preferably in a range of 0.01 to 30% by mass, more preferably in a range of 0.1 to 10% by mass.

<External Additives>

For improving the fluidity, chargeability, cleaning property and the like of the toner, external additives such as so-called post-treatment agents such as a superplasticizer and a cleaning aid may be added to the toner particles to form the toner of the present invention.

Examples of the external additive include inorganic particles, for example, silica particles, alumina particles, inorganic oxide particles such as titanium oxide particles, inorganic stearic acid compound particles such as aluminum stearate particles and zinc stearate particles, and inorganic titanic acid compound particles such as strontium titanate particles and zinc titanate particles. These external additives can be used alone or in combination of two or more thereof.

These inorganic particles may be subjected to a surface treatment with a silane coupling agent, a titanium coupling agent, a higher fatty acid, a silicone oil or the like in order to improve heat-resistance storage properties and environmental stability.

The addition amount of these external additives in the toner is preferably 0.05 to 5% by mass, more preferably 0.1 to 3% by mass.

<Average Particle Diameter of Toner>

The average particle diameter of the toner is preferably 4 to 10 μm, more preferably 6 to 9 μm in terms of volume-based median diameter (D50). When the volume-based median diameter (D50) is in the above-mentioned range, transfer efficiency is increased, so that halftone image quality is improved, leading to improvement of image quality of thin lines and dots.

In the present invention, the volume-based median diameter (D50) of the toner is measured and calculated using a measurement apparatus in which a computer system (manufactured by Beckman Coulter, Inc.) with data processing software "Software V3.51" is connected to "Coulter Counter 3" (manufactured by Beckman Coulter, Inc.).

Specifically, 0.02 g of a measurement sample (toner) is added to and fitted with 20 mL of a surfactant solution (a surfactant solution with, for example, a surfactant component-containing neutral detergent diluted with pure water by a factor of 10 for the purpose of dispersing toner particles), ultrasonic dispersion is then performed for 1 minute to prepare a toner dispersion liquid, and the toner dispersion liquid is injected with a pipette into a beaker containing "ISOTONII" (manufactured by Beckman Coulter, Inc.) until the concentration displayed on the measurement apparatus reaches 8%.

Here, by setting the concentration within the above-mentioned range, a reproducible measured value can be obtained. In the measurement apparatus, the count number of measurement particles is set to 25000, the aperture diameter is set to 50 μm, a frequency value when a range of 1 to 30 μm as a measurement range is divided by 256 is calculated, and the particle diameter of a particle at 50% from the largest in volume cumulative fractions is defined as a volume-based median diameter (D50).

[Method for Producing Toner]

The method for producing the toner of the present invention is not particularly limited. For example, when an azobenzene derivative alone is used as a toner, a production method including grinding an azobenzene derivative obtained by the above-mentioned synthesis method by using an apparatus such as a hammer mill, a feather mill or a counter jet mill, and then performing classification so as to obtain a desired particle diameter by using a dry classifier such as Spin Air Sieve, Classiel or Micron Classifier is preferable.

When a toner that contains an azobenzene derivative and a colorant, and does not contain a binding resin, a production method including forming a solution by dissolving the azobenzene derivative and the colorant using a solvent in which both the azobenzene derivative and the colorant are dissolved, then removing the solvent, and then performing grinding and classification by the same method as described above is preferable.

When a toner containing an azobenzene derivative, a colorant and a binding resin is produced, a production method using an emulsion aggregation method in which the particle diameter and shape are easily controlled is preferable.

Preferably, such a production method includes: (1A) a binding resin particle dispersion liquid preparing step of preparing a binding resin particle dispersion liquid; (1B) a colorant particle dispersion liquid preparing step of preparing a colorant particle dispersion liquid; (1C) an azobenzene derivative particle dispersion liquid preparing step of preparing an azobenzene derivative particle dispersion liquid; (2) an association step of adding a coagulant to an aqueous medium containing binding resin particles, colorant particles and azobenzene derivative particles, so that salting-out is advanced, and simultaneously the particles are aggregated and fused to form associated particles; (3) an aging step of forming toner particles by controlling the shapes of the associated particles; (4) a filtration and cleaning step of removing the toner particles from the aqueous medium by filtration, and removing a surfactant and so on from the toner particles; (5) a drying step of drying the cleaned toner particles; and (6) an external additive adding step of adding external additives to the dried toner particles. Hereinafter, the steps (1A) to (1C) will be described.

(1A) Binding Resin Particle Dispersion Liquid Preparing Step

In this step, resin particles are formed by previously known emulsion polymerization or the like, and the resin particles are aggregated and fused to form binding resin particles. As one example, polymerizable monomers that form a binding resin is added in an aqueous medium, and dispersed, and these polymerizable monomers are polymerized with a polymerization initiator to prepare a binding resin particle dispersion liquid.

In addition, as a method for obtaining a binding resin particle dispersion liquid, mention is made of not only the above-mentioned method in which a polymerizable monomer is polymerized with a polymerization initiator in an aqueous medium, but also, for example, a method in which a dispersion treatment is performed in an aqueous medium without using a solvent, or a method in which a crystalline resin is dissolved in a solvent such as ethyl acetate to obtain a solution, the solution is emulsified and dispersed in an aqueous medium using a dispersing machine, and a solvent removal treatment is then performed.

Here, a release agent may be included in the binding resin beforehand as necessary. In addition, it is preferable to appropriately perform polymerization in the presence of a known surfactant (e.g. an anionic surfactant such as sodium polyoxyethylene(2)dodecyl ether sulfate, sodium dodecyl sulfate, dodecyl benzene sulfonic acid).

The volume-based median diameter of the binding resin particles in the dispersion liquid is preferably from 50 to 300 nm. The volume-based median diameter of the binding resin particles in the dispersion liquid can be measured by a dynamic light scattering method using "Microtrack UPA-150" (manufactured by Nikkiso Co., Ltd.).

(1B) Colorant Particle Dispersion Liquid Preparing Step

This colorant particle dispersion liquid preparing step is a step of preparing a colorant particle dispersion liquid by dispersing a colorant in the form of fine particles in an aqueous medium.

The colorant can be dispersed using mechanical energy. The number-based median diameter of the colorant particles in the dispersion liquid is preferably 10 to 300 nm, more preferably 50 to 200 nm. The number-based median diameter of the colorant particles can be measured using an electrophoretic light scattering photometer "ELS-800" (manufactured by Otsuka Electronics Co., Ltd.).

(1C) Azobenzene Derivative Particle Dispersion Liquid Preparing Step

The azobenzene derivative particle dispersion liquid preparing step is a step of preparing an azobenzene derivative particle dispersion liquid by dispersing an azobenzene derivative in the form of fine particles in an aqueous medium. In preparation of the azobenzene derivative particle dispersion liquid, first an azobenzene derivative emulsion liquid is prepared. Examples of the method for preparing an azobenzene derivative emulsion liquid include a method in which an azobenzene derivative liquid with an azobenzene derivative dissolved in an organic solvent is obtained, and the azobenzene derivative liquid is then emulsified in an aqueous medium.

The method for dissolving an azobenzene derivative in an organic solvent is not particularly limited, and examples thereof include a method in which an azobenzene derivative is added to an organic solvent, and the mixture is stirred and mixed so that the azobenzene derivative is dissolved. The addition amount of the azobenzene derivative is preferably 5 parts by mass or more and 100 parts by mass or less, more preferably 10 parts by mass or more and 50 parts by mass or less based on 100 parts by mass of the organic solvent.

Next, the azobenzene derivative liquid and the aqueous medium are mixed, and stirred using a known dispersing machine such as a homogenizer. Accordingly, the azobenzene derivative forms droplets, and is emulsified in an aqueous medium to prepare an azobenzene derivative emulsion liquid.

The addition amount of the azobenzene derivative liquid is preferably 20 parts by mass or more and 200 parts by mass or less, more preferably 50 parts by mass or more and 100 parts by mass or less based on 100 parts by mass of the aqueous medium.

The temperature of each of the azobenzene derivative liquid and the aqueous medium during mixing them is in a temperature range below the boiling point of the organic solvent, and is preferably 20° C. or higher and 80° C. or lower, more preferably 30° C. or higher and 75° C. or lower. The temperature of the azobenzene derivative liquid and the temperature of the aqueous medium during mixing them may be identical to or different from each other, and are preferably identical to each other.

As stirring conditions of a dispersing machine having a capacity of, for example, 1 to 3 L, the rotation speed thereof is preferably 7000 rpm or more and 20000 rpm or less, and the stirring time thereof is preferably 10 minutes or more and 30 minutes or less.

The azobenzene derivative particle dispersion liquid is prepared by removing the organic solvent from the azobenzene derivative emulsion liquid. Examples of the method for removing the organic solvent from the azobenzene derivative emulsion liquid include known methods such as air blowing, heating, decompression and a combination thereof.

As one example, the organic solvent is removed from the azobenzene derivative emulsion liquid by heating the azobenzene derivative emulsion liquid at preferably 25° C. or higher and 90° C. or lower, more preferably 30° C. or higher and 80° C. or lower in an inert gas atmosphere of nitrogen or the like until about 80% by mass or more and 95% by mass or less of the initial amount of the organic solvent is removed. Accordingly, the organic solvent is removed from the aqueous medium to prepare an azobenzene derivative particle dispersion liquid with azobenzene derivative particles dispersed in an aqueous medium.

The mass average particle diameter of the azobenzene derivative particles in the azobenzene derivative particle dispersion liquid is preferably 90 nm or more and 1200 nm or less. The mass average particle diameter of the azobenzene derivative particles can be set within the above-mentioned range by appropriately adjusting the viscosity in blending of the azobenzene derivative in the organic solvent, the blending ratio of the azobenzene derivative liquid and water, the stirring speed of the dispersing machine in preparation of the azobenzene derivative emulsion liquid, and so on. The mass average particle diameter of the azobenzene derivative particles in the azobenzene derivative particle dispersion liquid can be measured using an electrophoretic light scattering photometer "ELS-800" (manufactured by Otsuka Electronics Co., Ltd.).

<Organic Solvent>

The organic solvent to be used in this step is not particularly limited as long as the azobenzene derivative in the present invention can be dissolved. Specific examples thereof include esters such as ethyl acetate and butyl acetate, ethers such as diethyl ether, diisopropyl ether and tetrahydrofuran, ketones such as acetone and methyl ethyl ketone, saturated hydrocarbons such as hexane and heptane, and halogenated hydrocarbons such as dichloromethane, dichloroethane and carbon tetrachloride.

These organic solvents may be used alone or in combination of two or more thereof. Among these organic solvents, ketones and halogenated hydrocarbons are preferable, and methyl ethyl ketone and dichloromethane are more preferable.

<Aqueous Medium>

Examples of the aqueous medium to be used in this step include water, and aqueous media which are mainly composed of water and contain optional components such a water-soluble solvent such as an alcohol or glycol, a surfactant and a dispersant. The aqueous medium is preferably a mixture of water and a surfactant.

Examples of the surfactant include cationic surfactants, anionic surfactants and nonionic surfactants. Examples of the cationic surfactant include dodecylammonium chloride, dodecylammonium bromide, dodecyltrimethylammonium bromide, dodecylpyridinium chloride, dodecylpyridinium bromide and hexadecyltrimethylammonium bromide. Examples of the anionic surfactant include fatty acid soaps such as sodium stearate and sodium dodecanoate, sodium dodecylbenzene sulfonate, and sodium dodecyl sulfate. Examples of the nonionic surfactant include polyoxyethylene dodecyl ether, polyoxyethylene hexadecyl ether, polyoxyethylene nonyl phenyl ether, polyoxyethylene lauryl ether, polyoxyethylene sorbitan monooleate ether and monodecanoyl sucrose.

These surfactants can be used alone or in combination of two or more thereof. Among the surfactants, anionic surfactants are preferably used, and sodium dodecylbenzene sulfonate is more preferably used.

The addition amount of the surfactant is preferably 0.01 parts by mass or more and 10 parts by mass or less, more preferably 0.04 parts by mass or more and 1 part by mass or less based on 100 parts by mass of the aqueous medium.

The steps from the (2) association step to the (6) external additive adding step can be carried out in accordance with various previously known methods.

The coagulant to be used in the (2) association step is not particularly limited, but one selected from metal salts is suitably used. Examples of the metal salt include monovalent metal salts such as salts of alkali metals such as sodium, potassium and lithium; divalent metal salts of calcium, magnesium, manganese, copper and the like; trivalent metal salts of iron, aluminum and the like. Specific examples of the metal salt may include sodium chloride, potassium chloride, lithium chloride, calcium chloride, magnesium chloride, zinc chloride, copper sulfate, magnesium sulfate and manganese sulfate. Among them, divalent metal salts are especially preferably used because aggregation can be advanced with a small amount of the metal salt. These coagulants can be used alone or in combination of two or more.

[Developer]

For the toner of the present invention, for example, there may be a case where a magnetic material is included in the toner, and the toner is used as a one-component magnetic toner, a case where the toner is mixed a so-called carrier, and used as a two-component developer, and a case where a nonmagnetic toner is used alone. In any of these cases, the toner can be suitably used.

As the magnetic material, for example, magnetite, γ-hematite, or various kinds of ferrites, or the like can be used.

As the carrier that forms the two-component developer, magnetic particles composed of a previously known material such as a metal such as iron, steel, nickel, cobalt, ferrite or magnetite, an alloy of such a metal and a metal such as aluminum or lead can be used.

As the carrier, it is preferable to use a coated carrier obtained by coating the surfaces of magnetic particles with a coating such as a resin, or a so-called resin dispersion-type carrier obtained by dispersing a magnetic powder in a binder resin. The resin for coating is not particularly limited, and for example, an olefin resin, a styrene resin, a styrene-acrylic resin, a silicone resin, a polyester resin, a fluororesin or the like is used. The resin for forming the resin dispersion-type carrier is not particularly limited, and a known resin can be used. For example, an acrylic resin, a styrene-acrylic resin, a polyester resin, a fluororesin, a phenol resin or the like can be used.

The volume-based median diameter of the carrier is preferably 20 to 100 μm, more preferably 25 to 80 μm. The volume-based median diameter of the carrier can be measured typically by a laser diffraction-type particle size distribution measuring apparatus "HELOS" (manufactured by SYMPATEC) equipped with a wet dispersing machine.

The mixed amount of the toner with respect to the carrier is preferably 2 to 10% by mass based on 100% by mass of the total mass of the toner and the carrier.

[Image Formation Method]

The toner of the present invention can be used in various known electrophotographic image formation methods. For example, the toner can be used in a method for formation of a monochromatic image and a method for formation of a full-color image. In the case of the method for formation of a full-color image, the toner can be applied to any image formation method such as a four cycle-type image formation method using four color developing apparatuses for yellow, magenta, cyan and black, respectively, and one photoreceptor, or a tandem-type image formation method in which an image formation unit having a color developing apparatus for each color and a photoreceptor is mounted for each color.

Figure 1:
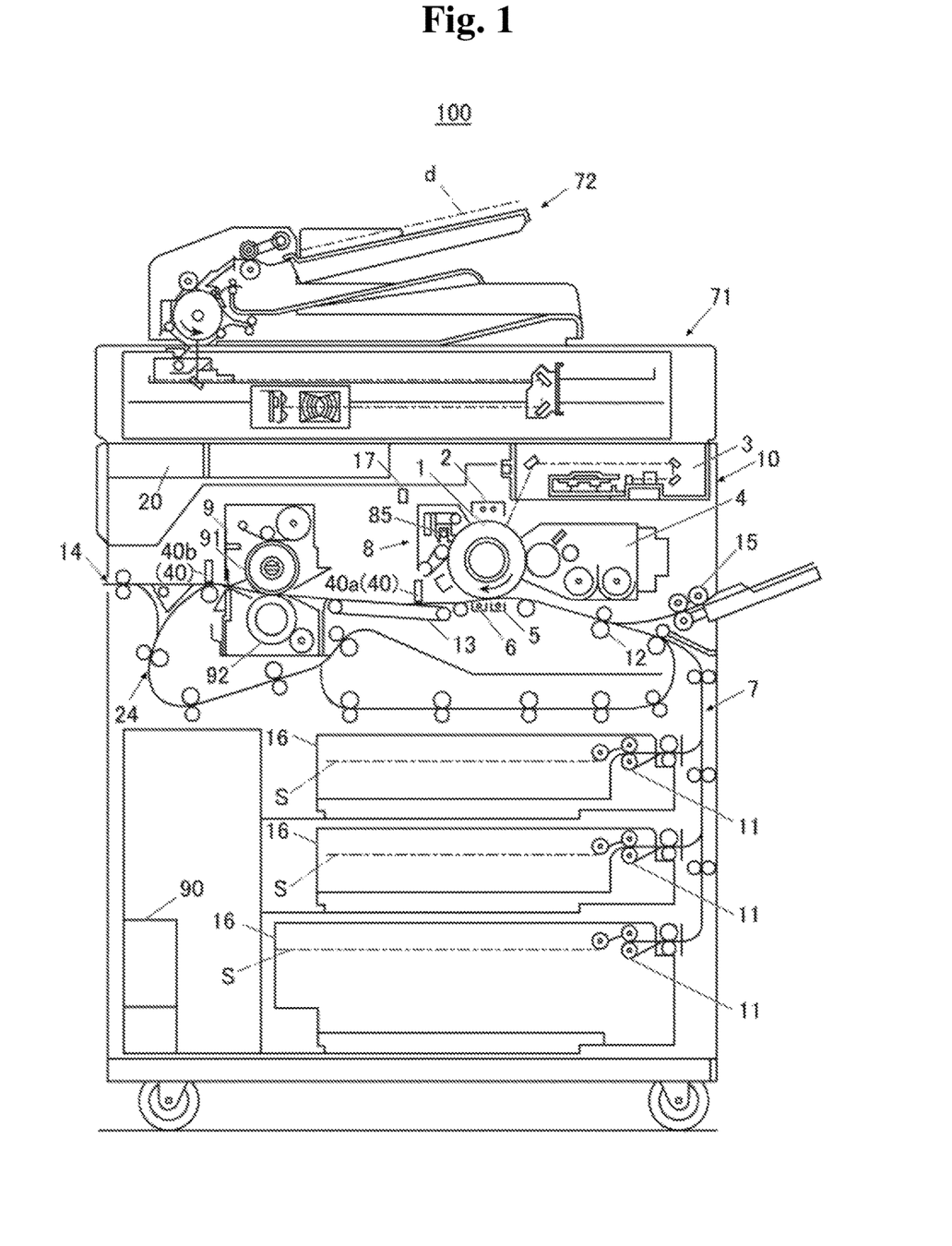
FIG. 1 is a schematic block diagram showing an image formation apparatus to be used in an image formation method according to one embodiment of the present invention.

FIG. 1 is a schematic block diagram showing an image formation apparatus 100 to be used in an image formation method according to one embodiment of the present invention. However, the image formation apparatus for use in the present invention is not limited to the following form and illustrated example. FIG. 1 shows an example of the image formation apparatus 100 for formation of a monochromatic, but the present invention can also be applied to an apparatus for formation of a color image.

The image formation apparatus 100 is an apparatus for forming an image on a recording sheet S as a recording medium, and includes an image reading apparatus 71 and an automatic document feeding apparatus 72. An image formation unit 10, a first irradiation unit 40a, a press-bonding unit 9 and a second irradiation unit 40b form an image on a recording sheet S conveyed by a sheet conveyance system 7. Hereinafter, the first irradiation unit 40a and the second irradiation unit 40b are collectively referred to as an irradiation unit 40.

In the image formation apparatus 100, the recording sheet S is used as a recording medium, but the medium on which an image is to be formed is not limited to a sheet.

A document d placed on a document table of the automatic document feeding apparatus 72 is scanned and exposed by an optical system of a scanning and exposure apparatus of the image reading apparatus 71, and read in an image sensor CCD. An analog signal photoelectrically converted by the image sensor CCD is subjected to analog processing, A/D conversion, shading correction, image compression processing and so on in an image processing unit 20, and then input to an exposure device 3 of the image formation unit 10.

The sheet conveyance system 7 includes a plurality of trays 16, a plurality of sheet feeding units 11, a conveyance roller 12, a conveyance belt 13 and the like. The trays 16 each contain the recording sheet S with a predetermined size, and actuates a sheet feeding unit 11 of a predetermined tray 16 in response to an instruction from a control unit 90 to supply the recording sheet S. The conveyance roller 12 conveys to the image formation unit 10 the recording sheet S sent from the tray 16 by the sheet feeding unit 11 or the recording sheet S delivered from a manual sheet feeding unit 15.

The image formation unit 10 is configured such that a charger 2, the exposure device 3, a development unit 4, a transfer unit 5, an electricity removal unit 6 and a cleaning unit 8 are arranged in this order on the periphery of the photoreceptor 1 along the rotation direction of the photoreceptor 1.

The photoreceptor 1 as an image carrier is an image carrier with a photoconductive layer formed on a surface thereof, and can be rotated in the arrow direction in FIG. 1 by a driving apparatus (not illustrated). A temperature and humidity meter 17 for detecting the temperature and humidity inside the image formation apparatus 100 is provided in the vicinity of the photoreceptor 1.

The charger 2 uniformly applies a charge to the surface of the photoreceptor 1 to uniformly charge the surface of the photoreceptor 1. The exposure device 3 includes a beam emission source such as a laser diode, and irradiates the charged surface of the photoreceptor 1 with beam light to eliminate a charge on the irradiated portion, so that an electrostatic latent image corresponding to image data is formed on the photoreceptor 1. The development unit 4 supplies the internally contained toner to the photoreceptor 1 to form a toner image based on the electrostatic latent image on the surface of the photoreceptor 1.

The transfer unit 5 faces the photoreceptor 1 with the recording sheet S interposed therebetween, and transfers the toner image to the recording sheet S. The electricity removal unit 6 removes electricity on the photoreceptor 1 after the toner image is transferred. The cleaning unit 8 includes a blade 85. The surface of the photoreceptor 1 is cleaned by the blade 85 to remove a developer remaining on the surface of the photoreceptor 1.

The recording sheet S to which the toner image is transferred is conveyed to the press-bonding unit 9 by the conveyance belt 13. The press-bonding unit 9 is optionally installed, and applies only pressure or heat and pressure to the recording sheet S, to which the toner image is transferred, by pressing members 91 and 92 to perform a fixation treatment, thereby fixing an image on the recording sheet S. The recording sheet S on which the image is fixed is conveyed to a sheet discharge unit 14 by a conveyance roller, and discharged from the sheet discharge unit 14 to outside the apparatus.

In addition, the image formation apparatus 100 includes a sheet reversing unit 24, so that the recording sheet S subjected to a heat-fixation treatment can be conveyed to the sheet reversing unit 24 before the sheet discharge unit 14, front-back-reversed, and discharged, or the front-back-reversed recording sheet S can be conveyed to the image formation unit 10 again to form images on both surfaces of the recording sheet S.

<Irradiation Unit>

Figure 2:
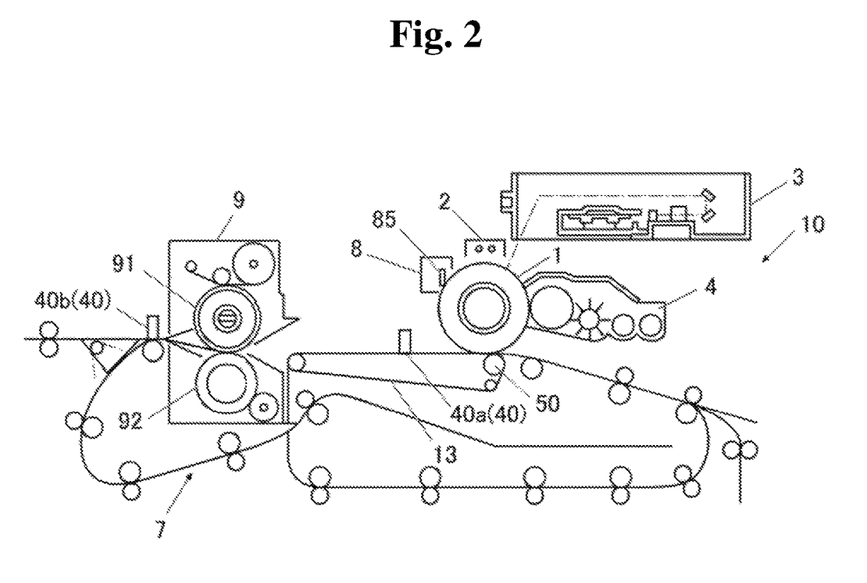
FIG. 2 is a schematic block diagram of an irradiation unit in the image formation apparatus.

FIG. 2 is a schematic block diagram of the irradiation unit 40 in the image formation apparatus 100.

The image formation apparatus 100 according to one embodiment of the present invention includes the irradiation unit 40 including the first irradiation unit 40a and the second irradiation unit 40b. Examples of the apparatus that forms the irradiation unit 40 include light emitting diodes (LEDs) and laser light sources.

The first irradiation unit 40a melts a compound (azobenzene derivative in the present invention) that is contained in a developer, and subjected to phase transition by absorbing light, and applies ultraviolet light having a wavelength preferably in a range of 300 nm or more and less than 400 nm, more preferably in a range of 330 nm or more and less than 390 nm. The irradiation amount of ultraviolet light in the first irradiation unit 40a is preferably in a range of 0.1 to 200 J/cm$^2$, more preferably in a range of 0.5 to 100 J/cm$^2$, still more preferably in a range of 1.0 to 50 J/cm$^2$.

The second irradiation unit 40b coagulates the azobenzene derivative, and applies visible light having a wavelength preferably in a range of 400 nm or more and 800 nm or less, more preferably in a range of 450 nm or more and 650 nm or less. The irradiation amount of visible light in the second irradiation unit 40b is preferably 0.1 to 200 J/cm$^2$, more preferably 0.5 to 100 J/cm$^2$, still more preferably 1.0 to 50 J/cm$^2$.

That is, an image formation method according to one embodiment of the present invention includes the steps of: forming a toner image including the toner of the present invention on a recording medium; softening the toner image by irradiating the toner image with light having a wavelength of 300 nm or more and less than 400 nm; and solidifying the toner image by irradiating the softened toner image with light having a wavelength of 400 nm or more and 800 nm or less, so that the toner image is fixed on the recording medium.

The first irradiation unit 40a and the second irradiation unit 40b apply light toward a first surface on the photoreceptor side in the recording sheet S holding the toner image, and are disposed on the photoreceptor side with respect to the surface of the recording sheet S nipped between the photoreceptor 1 and a transfer roller 50. In addition, the first irradiation unit 40a and the second irradiation unit 40b are arranged in this order along the a direction (sheet conveyance direction) in which the recording sheet S is conveyed.

The first irradiation unit 40a is disposed on the downstream side in the sheet conveyance direction with respect to the nip position between the photoreceptor 1 and a transfer roller 50, and on the upstream side in the sheet conveyance direction with respect to the press-bonding unit 9.

The second irradiation unit 40b is installed on the downstream side in the sheet conveyance direction with respect to the first irradiation unit 40a, and on the upstream side in the sheet conveyance direction with respect to the sheet discharge unit 14. The second irradiation unit 40b can be installed between the press-bonding unit 9 and the sheet discharge unit 14 in the sheet conveyance direction.

In an image formation method according to one embodiment of the present invention, a uniform potential is applied to the photoreceptor 1 by the charger 2 to charge the photoreceptor 1, and the photoreceptor 1 is scanned with a light flux applied by the exposure device 3 on the basis of original image data, so that an electrostatic latent image is formed. Next, a developer containing a compound (azobenzene derivative in the present invention) that is subjected to phase transition by absorbing light in the development unit 4 is supplied onto the photoreceptor 1.

Upon conveyance of the recording sheet S from the tray 16 to the image formation unit 10 at the time when the toner image carried on the surface of the photoreceptor 1 is led to the position of the transfer member 50 by rotation of the photoreceptor 1, a transfer bias applied to the transfer member 50 transfers the toner image on the photoreceptor 1 onto the recording sheet S nipped between the transfer member 50 and the photoreceptor 1.

In addition, the transfer member 50 also serves as a pressing member, and the azobenzene derivative contained in the toner image can be reliably brought into close contact with the recording sheet S while the toner image is transferred from the photoreceptor 1 to the recording sheet S.

After the toner image is transferred to the recording sheet S, the blade 85 of the cleaning unit 8 removes a developer remaining on the surface of the photoreceptor 1.

During a process in which the recording sheet S, to which the toner image is transferred, is conveyed to the press-bonding unit 9 by the conveyance belt 13, the first irradiation unit 40a irradiates the toner image, which is transferred onto the recording sheet S, with ultraviolet light having a wavelength of 300 nm or more and less than 400 nm. By applying ultraviolet light toward the toner image on the first surface of the recording sheet S by the first irradiation unit 40a, the toner image can be more reliably melted, so that the fixation property of the toner image to the recording sheet S can be improved.

When the recording sheet S holding the toner image is led to the press-bonding unit 9 by the conveyance belt 13, the pressing members 91 and 92 press-bond the toner image to the first surface of the recording sheet S. Before a fixation treatment is performed by the press-bonding unit 9, the toner image is softened by ultraviolet light irradiation by the first irradiation unit 40a, and therefore energy consumption for press-bonding of an image to the recording sheet S can be reduced. That is, it is preferable that the image formation method of the present invention further includes the step of pressing the softened toner image by a pressing member before the step of solidifying the toner image by irradiating the toner image with visible light having a wavelength of 400 nm or more and 800 nm or less, so that the toner image is fixed on the recording medium.

In addition, the pressing member 91 can heat the toner image on the recording sheet S in passage of the recording sheet S between the pressing members 91 and 92. The toner image softened by photoirradiation is further softened by the heating, and as a result, the fixation property of the toner image to the recording sheet S is further improved. The temperature of the pressing member 91 in heating of the toner image is preferably 30° C. or higher and 100° C. or lower, more preferably 40° C. or higher and 100° C. or lower.

The second irradiation unit 40b is provided so as to irradiate the toner image on the recording sheet S with visible light having a wavelength of 400 nm or more and 800 nm or less until the recording sheet S passing between the pressing members 91 and 92 reaches the sheet discharge unit 14. By applying visible light from the second irradiation unit 40b, the toner image on the recording sheet S can be more reliably solidified, so that the fixation property of the toner image to the recording sheet S can be further improved.

When images are formed on both surfaces of the recording sheet S, the recording sheet S subjected to a press-bonding treatment is conveyed to the sheet reversing unit 24 before the sheet discharge unit 14, front-back-reversed, and discharged, or the front-back-reversed recording sheet S is conveyed to the image formation unit 10 again.

EXAMPLES

The effect of the present invention will be described by way of the following examples and comparative example. However, the technical scope of the present invention is not limited to the following examples.

Synthesis of Azobenzene Derivative

Synthesis Example 1: Synthesis of Azobenzene Derivative (1)

75 mL of 2.4 N hydrochloric acid was added to 4-aminophenol (6.54 g, 60 mmol), and a solution obtained by dissolving sodium nitrite (4.98 g, 72 mmol) in 6 mL of distilled water was added while the mixture was cooled and stirred at 0° C., and the mixture was continuously stirred at 0° C. for 60 minutes. To this solution was added a mixed solution of o-cresol (6.48 g, 60 mmol) and a 20% sodium hydroxide aqueous solution (24 mL), and the mixture was stirred for 20 hours. The deposited precipitate was filtered, and the solid was washed with water. The resulting solid was purified by silica gel column chromatography using a mixed solution of ethyl acetate and hexane as a developing solvent, and recrystallized from a mixed solvent of acetone and hexane to obtain an intermediate A (see the reaction scheme A for the structure). To this intermediate A (2.28 g, 10 mmol) were added 100 mL of DMF, 1-bromohexane (9.9 g, 60 mmol) and potassium carbonate (6.9 g, 50 mmol), and the mixture was stirred at 80° C. for 2 hours, and then continuously stirred at room temperature for 20 hours. The solvent was distilled off under a reduced pressure, the mixture was then extracted with ethyl acetate, and the organic layer was washed with a saturated saline solution, and then dried over anhydrous magnesium sulfate. This was filtered, the solvent was then distilled off under a reduced pressure, and the resulting solid was purified by silica gel column chromatography using a mixed solution of ethyl acetate and hexane as a developing solvent to obtain an azobenzene derivative (1) (see the foregoing chemical formula).

Synthesis Example 2: Synthesis of Azobenzene Derivative (2)

Except that 1-bromooctane was used in place of 1-bromohexane, the same procedure as in Synthesis Example 1 was carried out to synthesize an azobenzene derivative (2) (see the foregoing chemical formula).

Synthesis Example 3: Synthesis of Azobenzene Derivative (3)

Except that 1-bromododecane was used in place of 1-bromohexane, the same procedure as in Synthesis Example 1 was carried out to synthesize an azobenzene derivative (3) (see the foregoing chemical formula).

Synthesis Example 4: Synthesis of Azobenzene Derivative (4)

Except that 2-bromophenol was used in place of o-cresol, and 1-bromododecane was used in place of 1-bromohexane, the same procedure as in Synthesis Example 1 was carried out to synthesize an azobenzene derivative (4) (see the foregoing chemical formula).

Synthesis Example 5: Synthesis of Azobenzene Derivative (5)

70 mL of DMF was added to tris(dibenzylideneacetone) dipalladium (0.46 g, 0.5 mmol), 2-di-tert-butylphosphino- 2',4',6'-triisopropylbiphenyl (0.85 g, 2 mmol) was then added with stirring under a nitrogen atmosphere at room temperature, and the mixture was continuously stirred under a nitrogen atmosphere at room temperature for 10 minutes. To this solution were added the azobenzene derivative (4) (3.15 g, 5 mmol), methanol (0.80 g, 25 mmol) and cesium carbonate (8.15 g, 25 mmol), and the mixture was stirred under a nitrogen atmosphere at 80° C. for 6 hours. The solvent was distilled off under a reduced pressure, the mixture was then extracted with ethyl acetate, and the organic layer was washed with a saturated saline solution, and then dried over anhydrous magnesium sulfate. This was filtered, the solvent was then distilled off under a reduced pressure, and the resulting solid was purified by silica gel column chromatography using a mixed solution of ethyl acetate and hexane as a developing solvent to obtain an azobenzene derivative (5) (see the foregoing chemical formula).

Synthesis Example 6: Synthesis of Azobenzene Derivative (6)

To 4-hexylaniline (17 g, 100 mmol) were added 1000 mL of toluene and active manganese dioxide (30 g, 350 mmol), and the mixture was continuously stirred at 120° C. for 8 hours. The solvent was distilled off under a reduced pressure, the mixture was then extracted with ethyl acetate, and the organic layer was washed with a saturated saline solution, and then dried over anhydrous magnesium sulfate. This was filtered, the solvent was then distilled off under a reduced pressure, and the resulting solid was purified by silica gel column chromatography using a mixed solution of ethyl acetate and hexane as a developing solvent. Thereafter, the solvent was removed to obtain an intermediate B (see the foregoing reaction scheme D for the structure). To this intermediate B (17.53 g, 50 mmol) were added 600 mL of DMF and N-bromosuccinimide (8.90 g, 50 mmol), and the mixture was continuously stirred at room temperature for 12 hours. The solvent was distilled off under a reduced pressure, the mixture was then extracted with ethyl acetate, and the organic layer was washed with a saturated saline solution, and then dried over anhydrous magnesium sulfate. This was filtered, the solvent was then distilled off under a reduced pressure, and the resulting solid was purified by silica gel column chromatography using a mixed solution of ethyl acetate and hexane as a developing solvent to obtain an intermediate C (see the foregoing reaction scheme D for the structure). To this intermediate C (2.15 g, 5 mmol) were added 80 mL of THF, methylboronic acid (0.36 g, 6 mmol), tetrakis(triphenylphosphine)palladium (0.58 g, 0.5 mmol) and potassium carbonate (1.66 g, 12 mmol), and the mixture was continuously stirred at 45° C. for 8 hours. The solvent was distilled off under a reduced pressure, the mixture was then extracted with ethyl acetate, and the organic layer was washed with a saturated saline solution, and then dried over anhydrous magnesium sulfate. This was filtered, the solvent was then distilled off under a reduced pressure, and the resulting solid was purified by silica gel column chromatography using a mixed solution of ethyl acetate and hexane as a developing solvent to obtain an azobenzene derivative (6) (see the foregoing chemical formula).

Synthesis Example 7: Synthesis of Azobenzene Derivative (7)

Except that 4-amino-o-cresol was used in place of 4-aminophenol, m-cresol was used in place of o-cresol, and 1-bromododecane was used in place of 1-bromohexane, the same procedure as in Synthesis Example 1 was carried out to synthesize an azobenzene derivative (7) (see the foregoing chemical formula).

Synthesis Example 8: Synthesis of Azobenzene Derivative (8)

Except that 4-amino-o-cresol was used in place of 4-aminophenol, 2-isopropylphenol was used in place of o-cresol, and 1-bromododecane was used in place of 1-bromohexane, the same procedure as in Synthesis Example 1 was carried out to synthesize an azobenzene derivative (8) (see the foregoing chemical formula).

Synthesis Example 9: Synthesis of Azobenzene Derivative (9)

Except that 4-amino-o-cresol was used in place of 4-aminophenol, 2-tert-butylphenol was used in place of o-cresol, and 1-bromododecane was used in place of 1-bromohexane, the same procedure as in Synthesis Example 1 was carried out to synthesize an azobenzene derivative (9) (see the foregoing chemical formula).

Synthesis Example 10: Synthesis of Azobenzene Derivative (10)

Except that 3,5-dimethylphenol was used in place of o-cresol, and 1-bromododecane was used in place of 1-bromohexane, the same procedure as in Synthesis Example 1 was carried out to synthesize an azobenzene derivative (10) (see the foregoing chemical formula).

Synthesis Example 11: Synthesis of Azobenzene Derivative (11)

Except that 4-amino-o-cresol was used in place of 4-aminophenol, 3,5-dimethylphenol was used in place of o-cresol, and 1-bromododecane was used in place of 1-bromohexane, the same procedure as in Synthesis Example 1 was carried out to synthesize an azobenzene derivative (11) (see the foregoing chemical formula).

Synthesis Example 12: Synthesis of Azobenzene Derivative (12)

Except that 4-amino-o-cresol was used in place of 4-aminophenol, 6-isopropyl-m-cresol was used in place of o-cresol, and 1-bromododecane was used in place of 1-bromohexane, the same procedure as in Synthesis Example 1 was carried out to synthesize an azobenzene derivative (12) (see the foregoing chemical formula).

[Preparation of Binding Resin]

(Preparation of Styrene-Acrylic Resin Particle Dispersion Liquid 1 Containing Styrene-Acrylic Resin 1)

(First-Stage Polymerization)

A solution obtained by dissolving 8 parts by mass of sodium dodecyl sulfate in 3000 parts by mass of ion-exchanged water was added in a reaction vessel equipped with a stirring device, a temperature sensor, a cooling pipe and a nitrogen introduction device, and the internal temperature was elevated to 80° C. while the solution was stirred at a stirring rate of 230 rpm under a nitrogen stream. After elevation of the temperature, a solution obtained by dissolving 10 parts by mass of potassium persulfate in 200 parts by mass of ion-exchanged water was added, the liquid temperature was set to 80° C. again, a polymerizable monomer solution including 480 parts by mass of styrene, 250 parts by mass of n-butyl acrylate, 68.0 parts by mass of methacrylic acid and 16.0 parts by mass of n-octyl-3-mercaptopropionate was added dropwise over 1 hour, and the mixture was then heated and stirred at 80° C. for 2 hours to perform polymerization, thereby preparing a styrene-acrylic resin particle dispersion liquid (1A) containing styrene-acrylic resin particles (1a).

(Second-Stage Polymerization)

A solution obtained by dissolving 7 parts by mass of sodium polyoxyethylene-2-dodecyl ether sulfate in 800 parts by mass of ion-exchanged water was added in a reaction vessel equipped with a stirring device, a temperature sensor, a cooling pipe and a nitrogen introduction device, the solution was heated to 98° C., a polymerizable monomer solution obtained by dissolving 260 parts by mass of the styrene-acrylic resin particle dispersion liquid (1A), 245 parts by mass of styrene, 120 parts by mass of n-butyl acrylate, 1.5 parts by mass of n-octyl-3-mercaptopropionate and 67 parts by mass of paraffin wax "HNP-11" (manufactured by NIPPON SEIRO CO., LTD) as a release agent at 90° C. was then added, and the mixture was mixed and dispersed for 1 hour by a mechanical dispersing machine "CREARMIX" (manufactured by M Technique Co., Ltd.) with a circulation path to prepare a dispersion liquid containing emulsified particles (oil droplets).

To this dispersion liquid was then added an initiator solution obtained by dissolving 6 parts by mass of potassium persulfate in 200 parts by mass of ion-exchanged water, and this system was heated and stirred at 82° C. for 1 hour to perform polymerization, thereby preparing a styrene-acrylic resin particle dispersion liquid (1B) containing styrene-acrylic resin particles (1b).

(Third-Stage Polymerization)

To the styrene-acrylic resin particle dispersion liquid (1B) was added a solution obtained by dissolving 11 parts by mass of potassium persulfate in 400 parts by mass of ion-exchanged water, and a polymerizable monomer solution including 435 parts by mass of styrene, 130 parts by mass of n-butyl acrylate, 33 parts by mass of methacrylic acid and 8 parts by mass of n-octyl-3-mercaptopropionate was added dropwise under the temperature condition of 82° C. over 1 hour. After completion of the dropwise addition, the mixture was heated and stirred for 2 hours to perform polymerization, and then cooled to 28° C. to obtain a styrene-acrylic resin particle dispersion liquid 1 containing a styrene-acrylic resin 1. The particle diameter of styrene-acrylic resin particles in the dispersion liquid 1 was measured by a dynamic light scattering method using "Microtrack UPA-150" (manufactured by Nikkiso Co., Ltd.), and the result showed that the volume-based median diameter was 120 nm. The glass transition point Tg of the styrene-acrylic resin 1 was measured, and the result showed that the glass transition temperature was 45° C.

(Preparation of Polyester Resin Particle Dispersion Liquid 1 Containing Polyester Resin 1)
(First-Stage Polymerization)

524 parts by mass of a 2 mol bisphenol A propylene oxide adduct, 105 parts by mass of terephthalic acid, 69 parts by mass of fumaric acid and 2 parts by mass of tin octylate (esterification catalyst) were added in a four-necked flask having a capacity of 10 liters and equipped with a nitrogen introducing pipe, a water removal pipe, stirrer and a thermometer, and a polycondensation reaction was carried out at a temperature of 230° C. for 8 hours. Further, the polycondensation reaction was continued at 8 kPa for 1 hour, and the reaction product was then cooled to 160° C. to obtain a polyester resin 1. 100 parts by mass of the polyester resin 1 was ground with "Roundel Mill Model: RM" (manufactured by TOKUJU Co., LTD), and mixed with 638 parts by mass of 0.26% by mass of sodium lauryl sulfate aqueous solution prepared in advance, and the mixture was ultrasonically dispersed at V-LEVEL and 300 µA for 30 minutes with stirring using an ultrasonic homogenizer "US-150T" (manufactured by NISSEI Corporation.), thereby obtaining a polyester resin particle dispersion liquid 2. The particle diameter of polyester resin particles in the dispersion liquid 2 was measured by a dynamic light scattering method using "Microtrack UPA-150" (manufactured by Nikkiso Co., Ltd.), and the result showed that the volume-based median diameter was 135 nm. The glass transition point Tg of the polyester resin 1 was measured, and the result showed that the glass transition temperature was 42° C.

[Preparation of Toners 1 to 7]

The azobenzene derivative (1) obtained as described above was coarsely ground by a hammer mill so as to have a particle diameter of 1 mm or less, and then finely ground with a collision type air flow grinder using a high-pressure gas, thereby obtaining a ground product of the azobenzene derivative. Next, the fine powder and the coarse powder were simultaneously classified and removed using Classiel, thereby obtaining a toner 1.

In addition, the azobenzene derivatives (2), (3), (4), (5), (8) and (11) were ground using a hammer mill in the same manner as described above, and then classified with Classiel to obtain toners 2 to 7.

[Preparation of Toner 8]
(Preparation of Carbon Black Dispersion Liquid)

11.5 parts by mass of sodium n-dodecyl sulfate was dissolved in 1600 parts by mass of pure water, 25 parts by mass of carbon black "Mogul L (manufactured by Cabot Corporation)" was gradually added, and "CLEAMIX (registered trademark) W Motion CLM-0.8 (manufactured by M Technique Co., Ltd.)" was then used to prepare a carbon black dispersion liquid. The particle diameter of the carbon black particles in the dispersion liquid was measured using an electrophoretic light scattering photometer "ELS-800" (manufactured by Otsuka Electronics Co., Ltd.), and the number-based median diameter was 118 nm.

(Preparation of Azobenzene Derivative Particle Dispersion Liquid 1)

80 parts by mass of dichloromethane and 20 parts by mass of the azobenzene derivative (1) were mixed and stirred while being heated at 50° C., thereby obtaining a liquid containing a compound 1. To 100 parts by mass of this solution was added a mixed solution of 99.5 parts by mass of distilled water heated to 50° C. and 0.5 parts by mass of a 20 mass % sodium dodecylbenzene sulfonate aqueous solution. Thereafter, the mixture was stirred at 16000 rpm for 20 minutes by a homogenizer equipped with a shaft generator 18F (manufactured by Heidolph Company), so that the mixture was emulsified to obtain an azobenzene derivative emulsion liquid 1.

The resulting azobenzene derivative emulsion liquid 1 was added in a separable flask, and heated and stirred at 40° C. for 90 minutes while nitrogen was fed into the gas phase, so that the organic solvent was removed to obtain an azobenzene derivative particle dispersion liquid 1. The particle diameters of azobenzene derivative particles in the azobenzene derivative particle dispersion liquid were measured using an electrophoretic light scattering photometer "ELS-800" (manufactured by Otsuka Electronics Co., Ltd.), and the result showed that the mass average particle diameter was 145 nm.

(Aggregation/Fusion)

504 parts by mass, in terms of a solid content, of the styrene-acrylic resin particle dispersion liquid 1 prepared as described above, 216 parts by mass, in terms of a solid content, of the azobenzene derivative particle dispersion liquid 1, 900 parts by mass of ion-exchanged water, and 70 parts by mass, in terms of solid content, of carbon black dispersion liquid were added in a reactor equipped with a stirring device, a temperature sensor and a cooling pipe. The inside of the vessel was kept at a temperature of 30° C. and the pH was adjusted to 10 by adding a 5 mol/liter sodium hydroxide aqueous solution.

Next, an aqueous solution obtained by dissolving 2 parts by mass of magnesium chloride hexahydrate in 1000 parts by mass of ion-exchanged water was added dropwise over 10 minutes under stirring, and elevation of the temperature was then started. The temperature of this system was elevated to 70° C. over 60 minutes, and the particle growth reaction was continued while the system was kept at 70° C. In this state, the particle diameters of associated particles were measured by "Multisizer 3" (manufactured by Beckman Coulter, Inc.), and at the time when the particles had a volume-based median diameter (D50) of 6.5 μm, an aqueous solution obtained by dissolving 190 parts by mass of sodium chloride in 760 parts by mass of ion-exchanged water was added to stop growth of particles. The mixture was stirred at 70° C. for 1 hour, the temperature was further elevated, and the mixture was heated and stirred at 75° C. to advance fusion of the particles. Thereafter, the mixture was cooled to 30° C. to obtain a toner particle dispersion liquid.

The toner particle dispersion liquid obtained as described above was subjected to solid-liquid separation by a centrifugal separator to form a wet cake of toner particles. The wet cake was washed with ion-exchanged water at 35° C. until the filtrate had an electroconductivity of 5 μS/cm in the centrifugal separator, and the wet cake was then transferred to "Flash Jet Dryer" (manufactured by SEISHIN ENTERPRISE Co., Ltd), and dried until the water content was 0.5% by mass, thereby preparing a toner 6.

[Preparation of Toners 9 to 17]

Except that a change was appropriately made as described in the table, the same procedure as in the method for preparation of the toner 8 was carried out to prepare toners 9 to 17.

[Preparation of Toner 18]

(Preparation of Suspension Liquid of Compound 1)

A suspension liquid of a compound 1 represented by the following chemical formula (2) was prepared in the same manner as described in "(1-1) Preparation of UV Softened Material Suspension Liquid A" in paragraphs "0217" to "0227" in Japanese Patent Application Laid-Open No. 2014-191078.

[Chemical Formula 9]

(2)

-continued

Except that the above-mentioned suspension liquid of the compound 1 was used in place of the azobenzene derivative dispersion liquid 1, the same procedure as in the method for preparation of the toner 8 was carried out to prepare a toner 18.

[Preparation of Developer]

9.5 g of an iron powder having a volume-based median diameter of 70 μm and 0.5 g of the toner of each of examples and a comparative example were added in a 20 ml glass container, and shaken for 20 minutes with a swing angle of 45° and an arm of 50 cm at a rate of 200 times per minute to prepare a developer.

[Evaluation: Fixation Property Test]

A fixation property test was conducted under a normal temperature and normal humidity environment (temperature: 20° C. and humidity: 50% RH) using the developer obtained as described above. Between a pair of parallel flat (aluminum) electrodes, one of which was provided with a developer and the other of which was provided with a plain paper (basis weight: 64 g/m$^2$), the developer was disposed while being slid by a magnetic force, and with the electrode-to-electrode gap set to 0.5 mm, and the DC bias and AC bias set to such a condition that the toner loading amount was 3 g/m$^2$, a toner was developed to form a toner layer on a surface of the paper, and the toner layer was fixed by each fixation apparatus to obtain a printed product. The printed product was used to conduct the fixation property test. A 1 cm-square image of this printed product was rubbed ten times with "JK Wiper (registered trademark)" (manufactured by NIPPON PAPER CRECIA Co., LTD.) under a pressure of 50 kPa, and the fixation property was evaluated on the basis of an image fixation ratio. A sample having fixation ratio of 50% or more is rated acceptable. The image fixation ratio is a numerical value obtained by measuring the densities of a printed image and a rubbed image with a reflection densitometer "RD-918" (manufactured by SAKATA INX ENG. CO., LTD.), dividing the reflection density of the rubbed solid image by the reflection density of the printed solid image, and expressing the thus-obtained value as a percentage.

As fixation apparatuses, the following three apparatuses formed by appropriately modifying the apparatus shown in FIG. 2 were used.

No. 1: The press-bonding unit 9 shown in FIG. 2 is not present, the wavelength of ultraviolet light applied from the first irradiation unit 40a is 365 nm (light source: LED light source that emits light having a wavelength of 365 nm±10 nm), and the irradiation dose is 10 J/cm$^2$. The wavelength of visible light applied from the second irradiation unit 40b is 505 nm (light source: LED light source that emits light having a wavelength of 505 nm±10 nm), and the irradiation dose is 20 J/cm$^2$.

No. 2: The press-bonding unit 9 shown in FIG. 2 is present, and the temperature of the pressing member 91 is 20° C. The light sources and irradiation doses of the first irradiation unit and the second irradiation unit are the same as in No. 1.

No. 3: The press-bonding unit 9 shown in FIG. 2 is present, and the temperature of the pressing member 91 is 80° C. The light sources and irradiation doses of the first irradiation unit and the second irradiation unit are the same as in No. 1.

[Evaluation: Thin Line Reproducibility Test]

A thin line reproducibility test was conducted under a normal temperature and normal humidity environment (temperature: 20° C. and humidity: 50% RH) using the developer obtained as described above. Between a pair of parallel flat (aluminum) electrodes, one of which was provided with a developer and the other of which was provided with a plain paper (basis weight: 64 g/m$^2$), the developer was disposed while being slid by a magnetic force, and with the electrode-to-electrode gap set to 0.5 mm, and the DC bias and AC bias set to such a condition that the toner loading amount was 3 g/m$^2$, a toner was developed to form a toner layer of thin lines with densities of 8 lines/mm, 6 lines/mm and 4 lines/mm on a surface of the paper, and the toner layer was fixed by each fixation apparatus to obtain a printed product. The printed product was used to conduct the fixation property test.

From a monitor image in which a thin line image section in the printed product was enlarged with a digital microscope "VHX-600" (manufactured by KEYENCE CORPORATION.), the line width (W1) of each of thin lines with densities of 8 lines/mm, 6 lines/mm and 4 lines/mm was measured by an indicator, and the thin line reproduction ratio of the line width (W1) to the line width (W2) before fixation was calculated from the formula {(W1/W2)×100}. The line width of the thin line of the toner varies depending on the measurement position, and both end portions in the line width direction of the thin line have irregularities in the line width direction. Therefore, in measurement of the line width, straight lines obtained by leveling the irregularities were drawn for both end portions, and the distance between the straight lines was defined as a line width. A level at which overlapping of thin lines is not recognized in visual observation corresponds to a thin line reproduction ratio of 110% or less, but there is no problem in practical use as long as the thin line reproduction ratio is 130% or less (acceptable). When the thin line reproduction ratio is more than 130%, mutual independence of the thin lines is impaired, so that overlapping is noticeable, and thus there is a problem in practical use.

The configurations of the toners, the types of fixation apparatuses and the evaluation results are shown in Table 1 below.

TABLE 1

| | Toner configuration | | | | Evaluation results | | | |
| | | | | | | | Thin line reproducibility test | |
| | Toner No. | Azobenzene derivative No. | binding resin | Azobenzene derivative:binding resin (mass ratio) | Fixation apparatus conditions No. | Fixation property test [%] | 8 lines/mm [%] | 6 lines/mm [%] | 4 lines/mm [%] |
|---|---|---|---|---|---|---|---|---|---|
| Example 1 | 1 | 1 | — | 100:0 | 1 | 98 | 126 | 126 | 123 |
| Example 2 | 2 | 2 | — | 100:0 | 1 | 98 | 125 | 124 | 122 |
| Example 3 | 3 | 3 | — | 100:0 | 1 | 70 | 122 | 120 | 120 |
| Example 4 | 4 | 4 | — | 100:0 | 1 | 62 | 123 | 123 | 122 |
| Example 5 | 5 | 5 | — | 100:0 | 1 | 65 | 123 | 121 | 119 |
| Example 6 | 6 | 8 | — | 100:0 | 1 | 89 | 120 | 120 | 118 |
| Example 7 | 7 | 11 | — | 100:0 | 1 | 92 | 120 | 118 | 116 |
| Example 8 | 8 | 1 | Styrene-acrylic resin | 30:70 | 2 | 92 | 114 | 113 | 113 |
| Example 9 | 9 | 1 | Styrene-acrylic resin | 10:90 | 2 | 85 | 104 | 103 | 103 |
| Example 10 | 10 | 1 | Polyester resin | 30:70 | 2 | 88 | 112 | 112 | 112 |
| Example 11 | 11 | 6 | Styrene-acrylic resin | 30:70 | 2 | 88 | 115 | 113 | 114 |
| Example 12 | 12 | 7 | Styrene-acrylic resin | 30:70 | 2 | 75 | 111 | 110 | 109 |
| Example 13 | 13 | 9 | Styrene-acrylic resin | 30:70 | 2 | 80 | 112 | 109 | 109 |
| Example 14 | 14 | 10 | Styrene-acrylic resin | 30:70 | 2 | 72 | 110 | 110 | 109 |
| Example 15 | 15 | 11 | Styrene-acrylic resin | 30:70 | 2 | 84 | 110 | 108 | 108 |
| Example 16 | 16 | 11 | Styrene-acrylic resin | 10:90 | 2 | 76 | 104 | 104 | 103 |
| Example 17 | 17 | 12 | Styrene-acrylic resin | 30:70 | 2 | 70 | 109 | 109 | 108 |
| Example 18 | 8 | 1 | Styrene-acrylic resin | 30:70 | 3 | 95 | 110 | 109 | 108 |
| Example 19 | 9 | 1 | Styrene-acrylic resin | 10:90 | 3 | 90 | 104 | 104 | 103 |
| Example 20 | 12 | 7 | Styrene-acrylic resin | 30:70 | 3 | 86 | 110 | 108 | 108 |
| Example 21 | 15 | 11 | Styrene-acrylic resin | 30:70 | 3 | 89 | 109 | 109 | 108 |
| Example 22 | 16 | 11 | Styrene-acrylic resin | 10:90 | 3 | 82 | 104 | 104 | 103 |
| Comparative Example 1 | 18 | Compound 1 | Styrene-acrylic resin | 30:70 | 3 | 17 | 110 | 107 | 108 |

As is evident from the Table 1, the toners of Examples 1 to 22 exhibited high fixation property. On the other hand, the toner of Comparative Example 1 had poor fixation property. Since the ultraviolet light source and ultraviolet light irradiation conditions used in the fixability test are constant throughout examples and the comparative example, it can be said that the toners of examples had a higher softening rate and improved fixation property as compared to the toner of the comparative example. In addition, the toners which contained a binding resin (Examples 8 to 22) had improved thin line reproducibility, particularly remarkably improved thin line reproducibility at a density of 8 lines/mm as compared to the toners which did not contain a binding resin (Examples 1 to 7).

In the case of using the toner containing a binding resin, comparison among the fixation apparatuses shows that the case when the fixation apparatus No. 3 with the pressing member 91 having a temperature of 80° C. is used (Examples 18 to 22) provided improved fixation property as compared to the case where the fixation apparatus No. 2 with the pressing member 91 having a temperature of 20° C. is used (Examples 8, 9, 12, 15 and 16).

Although embodiments of the present invention have been described and illustrated in detail, the disclosed embodimets are made for purposes of illustration and

REFERENCE SIGNS LIST

1 Photoreceptor
2 Charger
3 Exposure device
4 Development unit
5 Transfer unit
6 Electricity removal unit
7 Sheet conveyance system
8 Cleaning unit
9 Press-bonding unit
10 Image formation unit
11 Sheet feeding unit
12 Conveyance roller
13 Conveyance belt
14 Sheet discharge unit
15 Manual sheet feeding unit
16 Tray
17 Temperature and humidity meter
20 Image processing unit
24 Sheet reversing unit
40 Irradiation unit
40a First irradiation unit
40b Second irradiation unit
50 Transfer roller
71 Image reading apparatus
72 Automatic document feeding apparatus
85 Blade
90 Control unit
91, 92 Pressing member
100 Image formation apparatus
d Document
S Recording sheet

What is claimed is:

1. A toner comprising an azobenzene derivative represented by chemical formula (1):

wherein in the chemical formula (1), $R_1$ and $R_6$ are each independently an alkyl group or alkoxy group having 6 to 12 carbon atoms, and $R_2$ to $R_5$ and $R_7$ to $R_{10}$ are each independently a group selected from the group consisting of a hydrogen atom, an alkyl group, an alkoxy group, a halogen group, a hydroxy group and a carboxy group, and at least one of $R_2$ to $R_5$ and $R_7$ to $R_{10}$ is a group selected from the group consisting of an alkyl group, an alkoxy group, a halogen group, a hydroxy group and a carboxy group.

2. The toner according to claim 1, wherein in the chemical formula (1), at least one of $R_2$ to $R_5$ and $R_7$ to $R_{10}$ is an alkyl group or alkoxy group having 1 to 4 carbon atoms and optionally having a branched chain, or a halogen group.

3. The toner according to claim 1, wherein in the chemical formula (1), at least one of $R_2$ to $R_5$ and $R_7$ to $R_{10}$ is a methyl group.

4. The toner according to claim 1, further comprising a binding resin.

5. The toner according to claim 4, wherein the binding resin contains at least one selected from the group consisting of a styrene-acrylic resin and a polyester resin.

6. The toner according to claim 1, further comprising a colorant.

7. An image formation method comprising: forming a toner image including the toner according to claim 1 on a recording medium; softening the toner image by irradiating the toner image with light having a wavelength of 300 nm or more and less than 400 nm; and solidifying the toner image by irradiating the softened toner image with light having a wavelength of 400 nm or more and 800 nm or less, so that the toner image is fixed on the recording medium.

8. The image formation method according to claim 7, further comprising pressing the softened toner image with a pressing member before fixing the toner image on the recording medium.

9. The image formation method according to claim 8, wherein the temperature of the pressing member is 30° C. or higher and 100° C. or lower.

* * * * *